US012682473B2

(12) United States Patent
Onishi et al.

(10) Patent No.: US 12,682,473 B2
(45) Date of Patent: Jul. 14, 2026

(54) MEASUREMENT SYSTEM, INSPECTION SYSTEM, MEASUREMENT DEVICE, MEASUREMENT METHOD, INSPECTION METHOD, AND PROGRAM

(71) Applicant: OMRON Corporation, Kyoto (JP)

(72) Inventors: Takako Onishi, Kyoto (JP); Takayuki Nishi, Kyoto (JP); Shimpei Fujii, Kyoto (JP); Hironori Kasahara, Kyoto (JP); Yuji Karita, Kyoto (JP); Hiroyuki Mori, Kyoto (JP)

(73) Assignee: OMRON Corporation, Kyoto (JP)

( * ) Notice: Subject to any disclaimer, the term of this patent is extended or adjusted under 35 U.S.C. 154(b) by 366 days.

(21) Appl. No.: 18/259,749

(22) PCT Filed: Mar. 8, 2021

(86) PCT No.: PCT/JP2021/009041
§ 371 (c)(1),
(2) Date: Jun. 28, 2023

(87) PCT Pub. No.: WO2022/157993
PCT Pub. Date: Jul. 28, 2022

(65) Prior Publication Data
US 2024/0062401 A1 Feb. 22, 2024

(30) Foreign Application Priority Data
Jan. 20, 2021 (JP) ................................. 2021-007458

(51) Int. Cl.
*G01B 11/26* (2006.01)
*G01B 15/04* (2006.01)
(Continued)

(52) U.S. Cl.
CPC ................ *G06T 7/55* (2017.01); *G01B 11/26* (2013.01); *G01B 15/04* (2013.01); *G06T 7/001* (2013.01);
(Continued)

(58) Field of Classification Search
CPC .. G06T 7/55; G06T 7/001; G06T 7/74; G06T 2207/10116; G06T 2207/20221;
(Continued)

(56) References Cited

U.S. PATENT DOCUMENTS

| | | | |
|---|---|---|---|
| 2002/0015520 A1* | 2/2002 | Roder | G01N 23/044 382/147 |
| 2017/0356859 A1 | 12/2017 | Sugita et al. | |
| 2021/0156677 A1 | 5/2021 | Fu et al. | |

FOREIGN PATENT DOCUMENTS

| | | |
|---|---|---|
| CN | 102208109 A | 10/2011 |
| JP | 2003006618 A | 1/2003 |

(Continued)

OTHER PUBLICATIONS

International Search Report issued in Intl. Appln. No. PCT/JP2021/009041 mailed May 18, 2021. English translation provided.
(Continued)

*Primary Examiner* — Edward Park
*Assistant Examiner* — Alexander Joseph Vaughn
(74) *Attorney, Agent, or Firm* — ROSSI, KIMMS & McDOWELL LLP

(57) ABSTRACT

A measurement system includes a first feature point data generator, a second feature point data generator, and a calculator. The first feature point data generator generates first feature point data from first image data or from first shape data. The first image data is obtained from imaging of a measurement target and includes a predetermined portion of the measurement target. The first shape data is generated
(Continued)

based on the first image data. The second feature point data generator generates second feature point data from second image data different from the first image data or from second shape data. The calculator calculates a positional correspondence of the predetermined portion of the measurement target between the first image data and the second image data or between the first shape data and the second shape data based on the first feature point data and the second feature point data.

14 Claims, 8 Drawing Sheets

(51) Int. Cl.
  *G06T 7/00*       (2017.01)
  *G06T 7/55*       (2017.01)
  *G06T 7/73*       (2017.01)
(52) U.S. Cl.
  CPC ...... *G06T 7/74* (2017.01); *G06T 2207/10116* (2013.01); *G06T 2207/20221* (2013.01); *G06T 2207/30108* (2013.01)
(58) Field of Classification Search
  CPC ............. G06T 2207/30108; G06T 7/33; G06T 2207/10028; G06T 2207/10081; G06T 2207/30141; G01B 11/26; G01B 15/04; G01B 11/245
  See application file for complete search history.

(56)                References Cited

FOREIGN PATENT DOCUMENTS

| JP | 2003050110 | A |   | 2/2003 | |
| JP | 2008241643 | A |   | 10/2008 | |
| JP | 2012088114 | A |   | 5/2012 | |
| JP | 2012237729 | A | * | 12/2012 | .......... G01N 23/046 |
| JP | 2013186100 | A | * | 9/2013 | |
| JP | 2016038315 | A |   | 3/2016 | |
| JP | 2016045012 | A |   | 4/2016 | |
| JP | 2017223468 | A |   | 12/2017 | |
| JP | 2020008434 | A |   | 1/2020 | |
| WO | 2012053521 | A1 |   | 4/2012 | |
| WO | 2016063381 | A1 |   | 4/2016 | |
| WO | WO-2016135856 | A1 | * | 9/2016 | .............. G01C 3/06 |

OTHER PUBLICATIONS

Written Opinion issued in Intl. Appln. No. PCT/JP2021/009041 mailed May 18, 2021. English translation provided.
Notice of Reasons for Refusal issued in Japanese Appln. No. 2021-007458 mailed Apr. 22, 2025.
Office Action issued in Chinese Application No. 202180087844.2 mailed Feb. 13, 2026.
Chinese Doctoral Dissertations Full-text Database, Information Science and Technology, Apr. 2012, pp. 1-50. English translation of NPL 1 provided.
Tao et al. "Fast and Automatic Registration of Terrestrial Point Clouds Using 2D Line Features", Remote Sensing, 2020, pp. 1-16.

* cited by examiner

Figure 1:
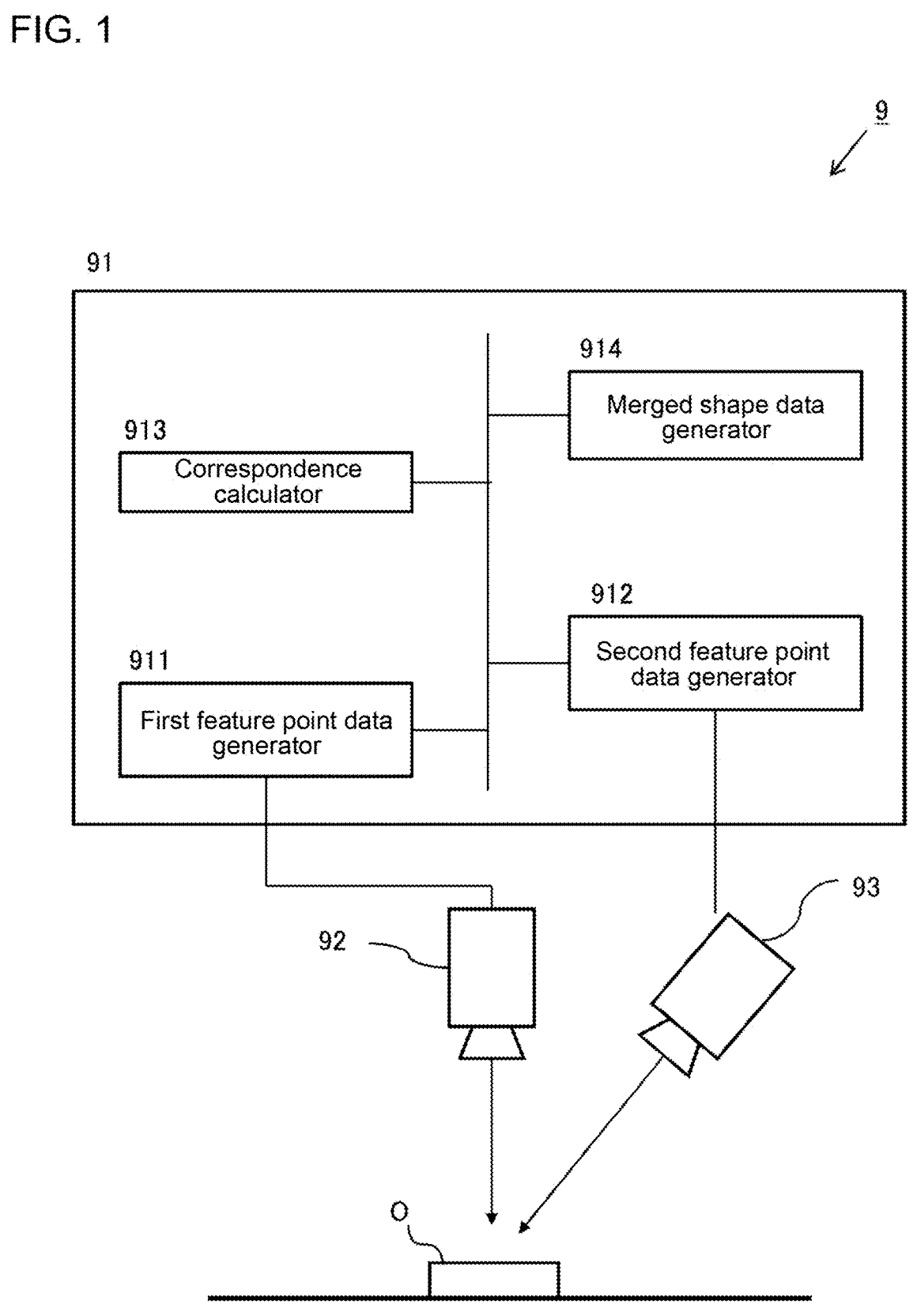

913
Correspondence calculator

914
Merged shape data generator

912
Second feature point data generator

911
First feature point data generator

92

93

O

| 0 | 0 | 0 | 0 | 0 | 0 | 0 | 0 |
| 0 | 0 | 0 | 0 | 0 | 0 | 0 | 0 |
| 1 | 1 | 1 | 0 | 0 | 0 | 0 | 0 |
| 1 | 1 | 1 | 0 | 0 | 0 | 0 | 0 |
| 0 | 1 | 1 | 0 | 0 | 0 | 0 | 0 |
| 0 | 1 | 1 | 0 | 0 | 0 | 0 | 0 |
| 0 | 1 | 1 | 1 | 1 | 1 | 1 | 1 |
| 0 | 1 | 1 | 1 | 1 | 1 | 1 | 1 |
| 0 | 0 | 0 | 0 | 0 | 0 | 0 | 0 |
| 0 | 0 | 0 | 0 | 0 | 0 | 0 | 0 |

FIG. 4

MEASUREMENT SYSTEM, INSPECTION SYSTEM, MEASUREMENT DEVICE, MEASUREMENT METHOD, INSPECTION METHOD, AND PROGRAM

FIELD

The present invention relates to a measurement system, an inspection system, a measurement apparatus, a measurement method, an inspection method, and a program.

BACKGROUND

In known processes for manufacturing various boards, images capturing boards are used in measurement and inspection. As a measurement apparatus for such measurement or inspection, a known technique (e.g., Patent Literature 1) increases shape measurement accuracy by, for example, including a single apparatus that can use different types of measurement principles and selecting and merging most relevant information from measurement results obtained with each principle based on the characteristics of the measurement area.

Patent Literature 1 describes a technique used by a visual inspection apparatus for boards with two measurement principles called a phase shifting method and a color highlight method. With this technique, individual pixels use more reliable measurement results of the two types of image data to increase shape measurement accuracy.

Various products have recently become smaller and more precise, thus causing component mounting boards to include more densely mounted components and more hidden portions in the field of view of an imaging apparatus. Visual inspection can thus inspect fewer components accurately. A known technique (e.g., Patent Literature 2) allows inspection using X-ray computed tomography (CT) of portions that cannot be inspected with visual inspection.

CITATION LIST

Patent Literature

Patent Literature 1: Japanese Unexamined Patent Application Publication No. 2016-38315

Patent Literature 2: Japanese Unexamined Patent Application Publication No. 2017-223468

SUMMARY

Technical Problem

Although the technique described in Patent Literature 1 above uses multiple measurement principles, a single imaging system can obtain image data for measurement. Thus, the different measurement principles can produce sets of image data that match each other in units of pixels. This allows comparison of reliability or generation of merged data in units of pixels for measurement result information between the different measurement principles.

In contrast, different imaging systems are used for imaging a measurement target board between a measurement principle using visible light images, such as the phase shifting method or the color highlight method, and a measurement principle using X-rays as in Patent Literature 2 (or another measurement principle such as laser scanning). Thus, the positions of the measurement target board may not match between the obtained sets of image data.

In other words, when a single board is imaged, a predetermined position (or a pixel indicating the position) in the board in a set of image data does not match the same position in another set of image data due to the differences in the state of holding the board, the differences in the imaging positions or angles, slight deformation in the board, or other factors during imaging of the board. This causes difficulty in selecting and merging most relevant information based on the characteristics of the measurement area as described in Patent Literature 1.

In response to the above circumstances, one or more aspects of the present invention are directed to merging data about an inspection target measured with multiple measurement principles using different imaging systems to allow highly accurate shape measurement.

Solution to Problem

The technique according to one or more aspects of the present invention provides the structure described below.

A measurement system for measuring a shape of at least a part of a measurement target includes a first feature point data generator, a second feature point data generator, and a calculator. The first feature point data generator generates first feature point data indicating a shape of a predetermined portion of the measurement target from first image data or from first shape data. The first image data is obtained from imaging of the measurement target and includes the shape of the at least the part of the measurement target. The first shape data is generated based on the first image data. The second feature point data generator generates second feature point data indicating the shape of the predetermined portion of the measurement target from second image data or from second shape data. The second image data includes the shape of the at least the part of the measurement target and is obtained differently from the first image data. The second shape data is generated based on the second image data. The calculator calculates a positional correspondence of the predetermined portion of the measurement target between the first image data and the second image data or between the first shape data and the second shape data based on the first feature point data and the second feature point data.

Being obtained differently herein includes being imaged at different time points, as well as being imaged with different imagers. Calculating the correspondence includes calculating the correspondence between pixels indicating the same area in the measurement target in multiple images when, for example, different sets of image data each use a different scale (a scale factor) or include a single area in a measurement target with a different positional relationship on the image data. More specifically, when the first image data and the second image data including a predetermined number of pixels each include a pixel indicating a single area in a measurement target with different coordinates, or for example, coordinates (10, 20) in the first image data and coordinates (12, 13) in the second image data, calculating the correspondence includes calculating the correspondence between the coordinates of these pixels. When the first image data and the second image data include images with different sizes (scale factors), calculating the correspondence also includes calculating the correspondence between pixels indicating the same area in the measurement target in these sets of image data. When the first image data has a resolution different from the resolution of the second image data, or for example, a pixel at coordinates (10.3, 20.6) in the first image data corresponds to a pixel at coordinates (10, 20)

in the second image data, calculating the correspondence also includes calculating the correspondence between the different resolutions.

As described above, the measurement system with the feature point data generators and the calculator can calculate the pixel-to-pixel correspondence between the multiple sets of image data obtained from different imaging systems, and can perform processing such as merging based on the calculated correspondence.

The measurement system may further include a first imager that images the measurement target, and a second imager that images the measurement target. The imager herein includes, for example, an X-ray camera for detecting X-rays and a photomultiplier sensor used in laser scanning, in addition to a camera for detecting wavelengths within the visible light range. The measurement system with this structure can internally obtain image data about the measurement target without obtaining image data from an external device.

The first imager may be a visible light camera. The second imager may be an X-ray camera. With this structure, the correspondence can be calculated using an accurate part of image data with different features.

The calculator may include at least one of an XY calculator that determines a positional correspondence of the measurement target in a horizontal direction, or a Z calculator that determines a positional correspondence of the measurement target in a vertical direction.

A direction orthogonal to the horizontal surface of a measurement target (or in other words, the vertical direction) is herein referred to as Z-axis. Directions orthogonal to Z-axis (or in other words, horizontal directions) herein include a direction referred to as Y-axis indicating the depth and a direction referred to as X-axis intersecting with Y-axis at right angles on the horizontal surface.

The first feature point data may include at least one of coordinate data indicating the shape of the predetermined portion of the measurement target, binary image data indicating the shape of the predetermined portion of the measurement target, multivalued image data indicating the shape of the predetermined portion of the measurement target, or height inflection point data indicating a three-dimensional shape of the predetermined portion of the measurement target. The second feature point data may include at least one of coordinate data indicating the shape of the predetermined portion of the measurement target, binary image data indicating the shape of the predetermined portion of the measurement target, multivalued image data indicating the shape of the predetermined portion of the measurement target, or height inflection point data indicating the three-dimensional shape of the predetermined portion of the measurement target.

The binary image data herein may be data in which 1 is set as a flag for pixels identified to correspond to the shape of a predetermined portion from, for example, the color or luminance on image data, and 0 is set for the remaining pixels. The multivalued image data may be, for example, image data including the predetermined portion processed with edge extraction.

As feature point data, most appropriate data differs depending on a portion of the measurement target for which the shape is indicated by the feature point data. Thus, the above described feature point data is used as appropriate for the portion to allow accurate determination of the correspondence between different sets of image data.

The measurement target may be a board on which a component is mounted. The shape of the predetermined portion of the measurement target may include at least one of a shape of a wiring pattern on the board, a shape of a land on the board, a shape of an electrode in the component mounted on the board, or a shape of solder on the board.

The feature point data is to be obtained from a portion with a shape identifiable with any imaging devices using different measurement principles. For the shapes of the portions listed above, image data obtained with, for example, either a visible light camera or an X-ray camera includes identifiable shapes of the portions. Thus, effective feature point data can be obtained.

The measurement system may further include a merged shape data generator that merges at least parts of the first image data and the second image data or at least parts of the first shape data and the second shape data based on the positional correspondence of the predetermined portion of the measurement target calculated by the calculator, and generates merged shape data of the predetermined portion of the measurement target. The obtained merged shape data allows accurate measurement of the shape of an inspection target.

The first image data may be imaged with a visible light camera. The second image data may be X-ray image data. The merged shape data generator may generate the merged shape data of the predetermined portion of the measurement target by using, with priority, the second image data or the second shape data for an area in a blind spot of the visible light camera in the first image data.

This structure can generate a three-dimensional (3D) shape based on accurate data from a visible light camera for an appearance of the measurement target, and can also generate a 3D shape based on image data from an X-ray camera for an area in a blind spot of the visible camera, allowing accurate 3D shape data without a blind spot to be obtained.

Another aspect of the present invention may also be directed to an inspection system for inspecting a measurement target. The inspection system includes the above measurement system and a merged data inspector that determines whether the measurement target or a component included in the measurement target is acceptable based on the merged shape data generated by the merged shape data generator.

This measurement target inspection system can perform inspection based on the merged shape data, and thus can perform highly accurate measurement target inspection with fewer cases of false rejection or false acceptance. The merged data inspector can also use a single inspection area and a single set of inspection criteria independently of the measurement principles, and thus can perform highly accurate measurement target inspection with reduced variations in inspection quality for measurement targets.

One or more aspects of the present invention may also be directed to an apparatus including the above structures.

A measurement method according to another aspect of the present invention is a measurement method for measuring a shape of at least a part of a measurement target. The measurement method includes generating first feature point data, generating second feature point data, and calculating a positional correspondence. The generating the first feature point data includes generating first feature point data indicating a shape of a predetermined portion of the measurement target from first image data or from first shape data. The first image data is obtained from imaging of the measurement target and includes the shape of the at least the part of the measurement target. The first shape data is generated based on the first image data. The generating the second feature point data includes generating second feature point data indicating the shape of the predetermined portion of the measurement target from second image data or from second shape data. The second image data includes the shape of the at least the part of the measurement target and is obtained differently from the first image data. The second shape data is generated based on the second image data. The calculating the positional correspondence includes calculating a positional correspondence of the predetermined portion of the measurement target between the first image data and the second image data or between the first shape data and the second shape data based on the first feature point data and the second feature point data.

The calculating the positional correspondence may include at least one of determining a positional correspondence of the measurement target in a horizontal direction, or determining a positional correspondence of the measurement target in a vertical direction.

The measurement method may further include merging at least parts of the first image data and the second image data or at least parts of the first shape data and the second shape data based on the calculated positional correspondence of the predetermined portion of the measurement target, and generating merged shape data of the predetermined portion of the measurement target.

The first image data may be imaged with a visible light camera. The second image data may be X-ray image data. The generating the merged shape data may include generating merged shape data of the predetermined portion of the measurement target using, with priority, the second image data or the second shape data for an area in a blind spot of the visible light camera in the first image data.

Another aspect of the present invention may also be directed to an inspection method for a measurement target. The inspection method includes obtaining merged shape data of a predetermined portion of a measurement target generated in the above generating the merged shape data, and determining whether the measurement target or a component included in the measurement target is acceptable based on the obtained merged shape data of the predetermined portion of the measurement target.

One or more aspects of the present invention may also be directed to a program for causing a computer to implement the method described above, or to a non-transitory computer-readable storage medium storing the program.

The above structures and processes may be combined with one another unless any technical contradiction arises.

Advantageous Effects

The technique according to the above aspects of the present invention allows highly accurate shape measurement by merging data about an inspection target measured with multiple measurement principles using different imaging systems.

BRIEF DESCRIPTION OF THE DRAWINGS

FIG. 1 is a schematic diagram of a measurement apparatus according to a first embodiment.

FIG. 4 is a diagram describing example feature point data in the second embodiment.

DETAILED DESCRIPTION

Figure 2:
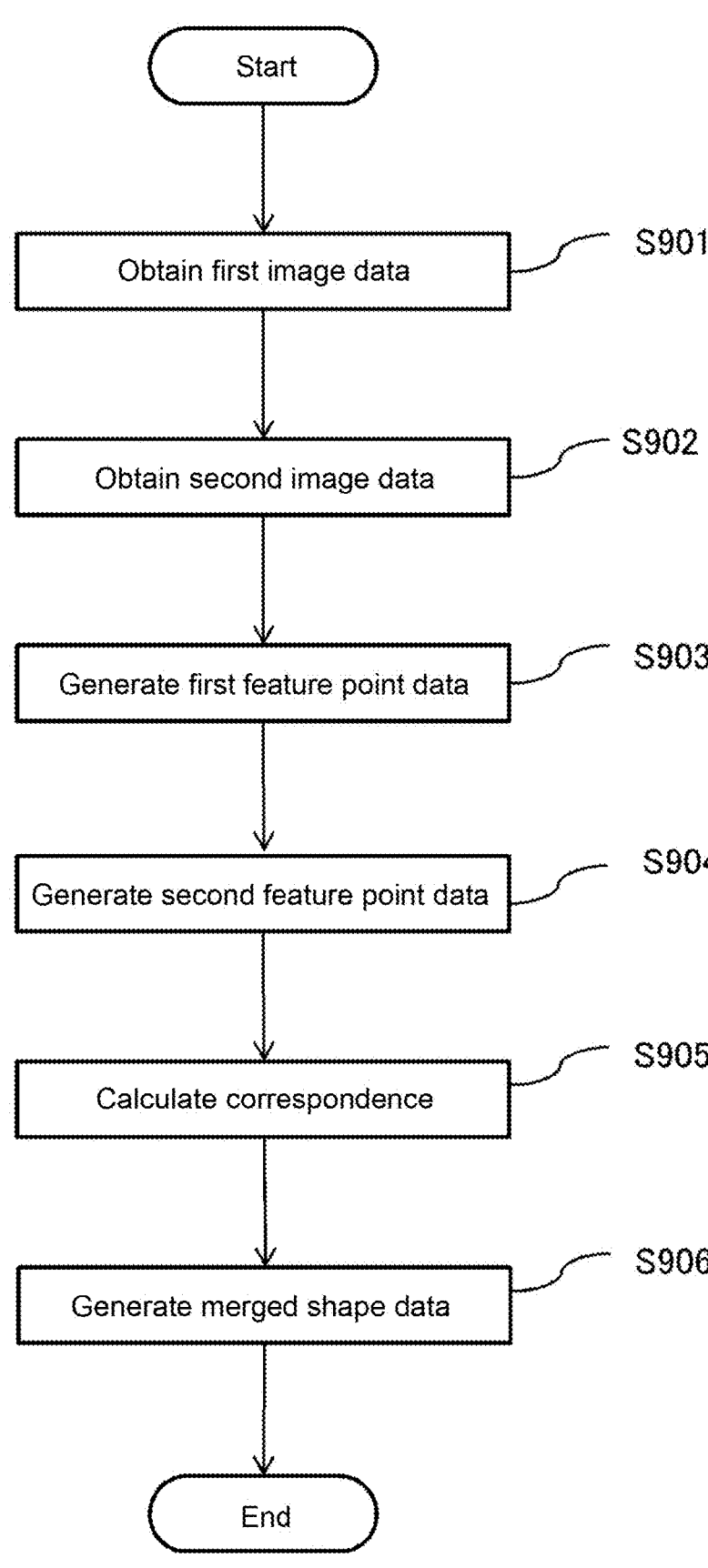
FIG. 2 is a flowchart showing a process performed by the measurement apparatus according to the first embodiment.

Embodiments of the present invention will now be described with reference to the drawings. The dimensions, materials, shapes, and relative positions of the components described in the embodiments described below are not intended to limit the scope of the invention, unless otherwise specified.

Example Use

Example Structure

An information processing apparatus according to one or more embodiments of the present invention includes functions to determine the three-dimensional (3D) shape of a measurement target based on image data about the measurement target imaged with two different measurement principles (imagers). FIG. 1 is a schematic diagram of a measurement apparatus 9 including an information processing apparatus 91 in the example use.

The information processing apparatus 91 may include, for example, a general-purpose computer and other devices. The information processing apparatus 91 includes, as its functional components, a first feature point data generator 911, a second feature point data generator 912, a correspondence calculator 913, and a merged shape data generator 914. Although not shown, the information processing apparatus 91 may additionally include, for example, various input units such as a mouse or a keyboard, an output unit such as a display, a storage such as a random-access memory (RAM) or a hard disk drive (HDD), and a communicator.

The first feature point data generator 911 generates first feature point data indicating the shape of a predetermined portion of the measurement target based on first image data including the imaged measurement target. The second feature point data generator 912 generates second feature point data indicating the shape of the predetermined portion of the measurement target based on the first image data including the imaged measurement target. The first image data and the second image data may be prestored in the storage, or may be obtained from an external device through, for example, the communicator or the input unit.

The correspondence calculator 913 performs the processing for calculating the positional correspondence of the predetermined portion of the measurement target between the first image data and the second image data based on the first feature point data and the second feature point data to allow the merged shape data generator 914 (described later) to generate merged 3D shape data. More specifically, the correspondence calculator 913 generates, for example, a criterion for transforming the coordinates of pixels in the second image data to the coordinates in the coordinate system for the first image data.

The first image data and the second image data are sets of image data about the measurement target imaged with different imagers. Thus, positions (coordinates) on these sets of image data indicating a single portion of the measurement target do not match. Although these sets of image data cannot be merged without being processed, the correspondence calculator 913 calculates the correspondence between these two sets of image data for pixel-to-pixel alignment.

The merged shape data generator 914 merges at least parts of the first image data and the second image data based on the positional correspondence of the predetermined portion of the measurement target between the first image data and the second image data calculated by the correspondence calculator 913, and generates 3D shape data about the predetermined portion of the measurement target.

The 3D shape data may be generated by, for example, using information about more reliable image data from the first image data and the second image data as a pixel in the merged data for every pixel indicating the predetermined portion of the measurement target. Different imaging angles, for example, cause different areas to be in a blind spot. For areas in a blind spot in one set of image data, information in the other set of image data may be used. This allows accurate merged 3D shape data to be generated using more reliable image information alone.

First Embodiment

An embodiment of the present invention will now be described in more detail with reference to FIGS. 1 and 2. The measurement apparatus 9 according to the present embodiment images a component mounting board (hereafter also simply referred to as a board) as a measurement target with two types of different measurement principles (imagers) to determine the 3D shape of the board based on the image data. The measurement apparatus 9 mainly includes an information processing apparatus 91, a first imager 92, and a second imager 93.

The first imager 92 and the second imager 93 are optical cameras for imaging, from predetermined angles, a measurement target board O being transported on a transport roller (not shown). The first imager 92 images the board O being a measurement target from right above in the angle perpendicular to the board surface, and outputs orthogonal image data to the information processing apparatus 91. The second imager 93 images the board O from an angle oblique to the board surface, and outputs oblique image data to the information processing apparatus 91.

The information processing apparatus 91 includes components and functions similar to the information processing apparatus described in the above example use, and will not be described repeatedly. The measurement target, the first image data, and the second image data in the example use correspond to the board O, the orthogonal image data, and the oblique image data in the present embodiment.

In the present embodiment, feature point data may be, for example, X- and Y-coordinate data about four points indicating ends (vertices) of a predetermined land on the board O. In this case, a shape defined by the points is the shape of the land.

(Process)

The process performed by the measurement apparatus 9 in the present embodiment is shown in FIG. 2. The measurement apparatus 9 first images the board O with the first imager 92 to obtain orthogonal image data (S901), and then images the board O with the second imager 93 to obtain oblique image data (S902).

In the measurement apparatus 9, the first feature point data generator 911 generates first feature point data based on the orthogonal image data (S903), and the second feature point data generator 912 generates second feature point data based on the oblique image data (S904).

In the measurement apparatus 9, the correspondence calculator 913 then calculates the positional correspondence of a predetermined portion of the board O between the orthogonal image data and the oblique image data (S905) based on the first feature point data and the second feature point data generated in steps S903 and S904. This allows these images to be processed based on the calculated correspondence between the orthogonal image data and the oblique image data.

The measurement apparatus 9 further merges at least parts of the orthogonal image data and the oblique image data to generate 3D shape data about the predetermined portion of the board O (S906) based on the positional correspondence of the predetermined portion of the board O between the orthogonal image data and the oblique image data calculated in step S905. This ends the processing routine. The routine is repeated as appropriate for the measurement target area to obtain intended measurement results.

The measurement apparatus 9 according to the present embodiment merges data about an inspection target measured with multiple measurement principles using different imaging systems and can obtain highly accurate shape measurement results.

Second Embodiment

Although the measurement apparatus 9 according to the above first embodiment is a single apparatus including multiple optical cameras with different angles, an apparatus according to another embodiment of the present invention may have a different structure. Another embodiment of the present invention will now be described below with reference to FIGS. 3 to 8 using an example system for performing board inspection with a visual inspection apparatus and an X-ray inspection apparatus.

(System Configuration)

Figure 3:
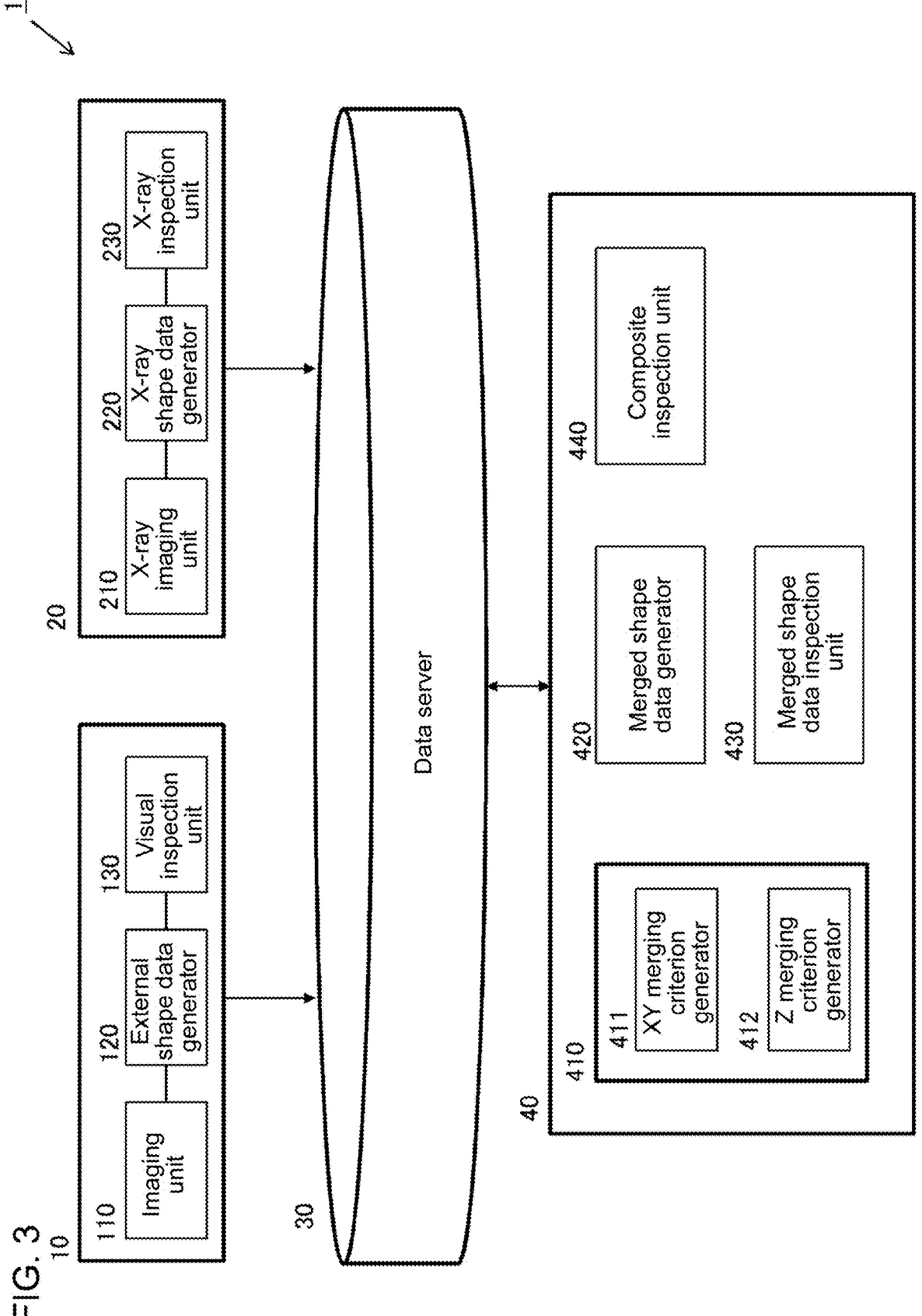
FIG. 3 is a schematic block diagram of a high-accuracy board inspection system according to a second embodiment.

FIG. 3 is a schematic block diagram of a high-accuracy board inspection system 1 according to the present embodiment. The high-accuracy board inspection system 1 according to the present embodiment schematically includes a visual inspection apparatus 10, an X-ray inspection apparatus 20, a data server 30, and a high-accuracy inspection terminal 40 that are connected with a communicator (not shown) to allow communication between them. The system performs board inspection based on more highly accurate measurement results obtained based on board measurement results from the visual inspection apparatus 10 and from the X-ray inspection apparatus 20.

The visual inspection apparatus 10 performs visual inspection of component mounting boards with, for example, an inspection method combining a phase shift method and a color highlight method. The inspection method combining the phase shift method and the color highlight method is a known technique and will not be described in detail. The inspection with this method allows accurate detection of the externally visible shapes of electrodes and the degree of slope of fillets at lands on a board. The phase shift method can restore the 3D shape of an object surface by projecting patterned light onto the object surface and analyzing distortion of the pattern. The color highlight method can convert the 3D shape of a solder surface to two-dimensional color information by illuminating a board with light of multiple colors (wavelengths) at different angles of incidence to allow color features (the colors of the light source in the specular reflection direction as viewed from the camera) to appear on the solder surface along its normal direction and capturing images in this state.

The visual inspection apparatus 10 mainly includes, as its functional components, an imaging unit 110, an external shape data generator 120, and a visual inspection unit 130. The visual inspection apparatus 10 also includes, for example, a projector, a light source, and a stage for receiving a board (all not shown). The imaging unit 110 captures an image of a board illuminated with light from the projector and the light source (not shown) and outputs the image as a visual inspection image. The external shape data generator 120 measures the external shape of the board based on the visual inspection image and generates external shape data. The visual inspection unit 130 compares the external shape data with an inspection criterion to perform visual inspection (or in other words, acceptance determination) of the board (or the components on the board). Inspecting a board hereafter includes inspecting components on the board.

The visual inspection unit 130 further generates external feature point data from the external shape data. The external feature point data may be coordinate data indicating the shape of a predetermined portion (e.g., a metal part connected to the components; the same applies hereafter) of the board, binary image data indicating the shape of the predetermined portion of the board, multivalued image data indicating the shape of the predetermined portion of the board, or height inflection point data indicating the 3D shape of the predetermined portion of the board that are obtained from the external shape data.

The items of information about the visual inspection images, the external shape data, the visual inspection results, and the external feature point data described above are transmitted from the visual inspection apparatus 10 to the data server 30, and are stored into the data server 30.

The X-ray inspection apparatus 20 generates, for example, 3D shape data about a board with a method such as computed tomography (CT) or tomosynthesis, and performs acceptance determination of the board based on the 3D data.

The X-ray inspection apparatus 20 mainly includes, as its functional components, an X-ray imaging unit 210, an X-ray shape data generator 220, and an X-ray inspection unit 230. The X-ray inspection apparatus 20 also includes, for example, an X-ray source and a stage for receiving a board (all not shown). The X-ray imaging unit 210 captures an image of X-rays irradiated from the X-ray source (not shown) and transmitted through the board and outputs a tomographic image (hereafter referred to as an X-ray image) of the board. The X-ray shape data generator 220 measures the 3D shape of the board based on multiple X-ray images and generates 3D shape data (hereafter referred to as X-ray shape data). The X-ray inspection unit 230 compares the X-ray shape data with the inspection criterion to perform 3D shape inspection (or in other words, acceptance determination) of the board.

The X-ray inspection unit 230 further generates X-ray feature point data from the X-ray shape data. The X-ray feature point data may be coordinate data indicating the shape of the predetermined portion of the board, binary image data indicating the shape of the predetermined portion of the board, multivalued image data indicating the shape of the predetermined portion of the board, or height inflection point data indicating the 3D shape of the predetermined portion of the board that are obtained from the X-ray shape data. The items of information about the X-ray images, the X-ray shape data, the X-ray inspection results, and the X-ray feature point data described above are transmitted from the X-ray inspection apparatus 20 to the data server 30, and are stored into the data server 30.

The external feature point data and the X-ray feature point data described above are generated to indicate a metal part of the board that is identifiable by both the visual inspection apparatus 10 and the X-ray inspection apparatus 20. More specifically, these sets of data may indicate, for example, the shape of a wiring pattern, the shape of a land, the shape of an electrode in a component, or the shape of solder.

The high-accuracy inspection terminal 40 is, for example, a general-purpose computer. Although not shown, the high-accuracy inspection terminal 40 thus includes a processor such as a central processing unit (CPU) or a digital signal processor (DSP), a storage including a main storage such as a read-only memory (ROM) or a random-access memory (RAM) and an auxiliary storage such as an erasable programmable ROM (EPROM), a hard disk drive (HDD), or a removable medium, input units such as a keyboard and a mouse, and an output unit such as a liquid crystal display. The high-accuracy inspection terminal 40 may include a single computer or may include multiple computers that cooperate with one another.

The auxiliary storage stores, for example, an operating system (OS), various programs, various items of information about inspection targets, and various inspection criteria. The programs stored in the auxiliary storage are loaded into a work area in the main storage and executed to control, for example, each component, implementing each functional component (described later) for a predetermined purpose. The functional components may be partially or entirely implemented using a hardware circuit such as an application-specific integrated circuit (ASIC) or a field-programmable gate array (FPGA).

The functional components included in the high-accuracy inspection terminal 40 will now be described. The high-accuracy inspection terminal 40 includes, as its functional components, a merging criterion generator 410, a merged shape data generator 420, a merged shape data inspection unit 430, and a composite inspection unit 440.

The merging criterion generator 410 obtains the external feature point data and the X-ray feature point data stored in the data server 30, calculates the positional correspondence of the predetermined portion of the board between the external shape data and the X-ray shape data based on the feature point data, and generates a criterion for merging these sets of shape data.

Figure 4:
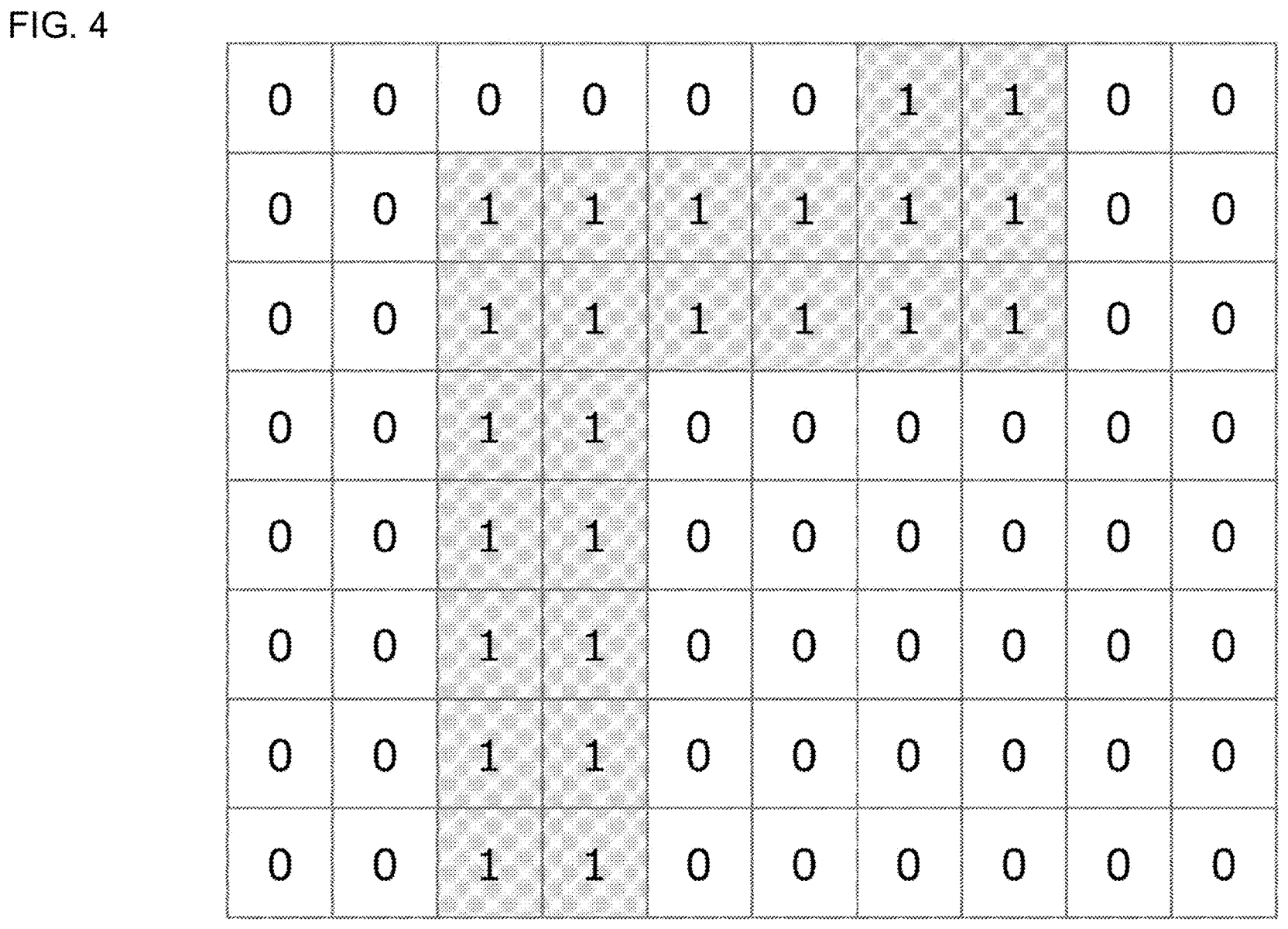

The merging criterion generator 410 includes an XY merging criterion generator 411 and a Z merging criterion generator 412. The XY merging criterion generator 411 generates an XY merging criterion (e.g., a transformation matrix) for transforming external shape data to X-ray shape data based on the correspondence between the coordinates of a wiring pattern in, for example, feature point data (binary image data in which flags are set for the wiring pattern) as shown in FIG. 4. More specifically, wiring patterns in the external shape data and in the X-ray shape data may be compared with one another using common pattern matching. Three or four highly matching points may then be selected from, for example, edges and corners of the wiring patterns. Three points may be selected to allow a matrix for affine transformation to be calculated with a common method.

Four points may be selected to allow a matrix for projective transformation to be calculated with a common method.

Figure 5B:
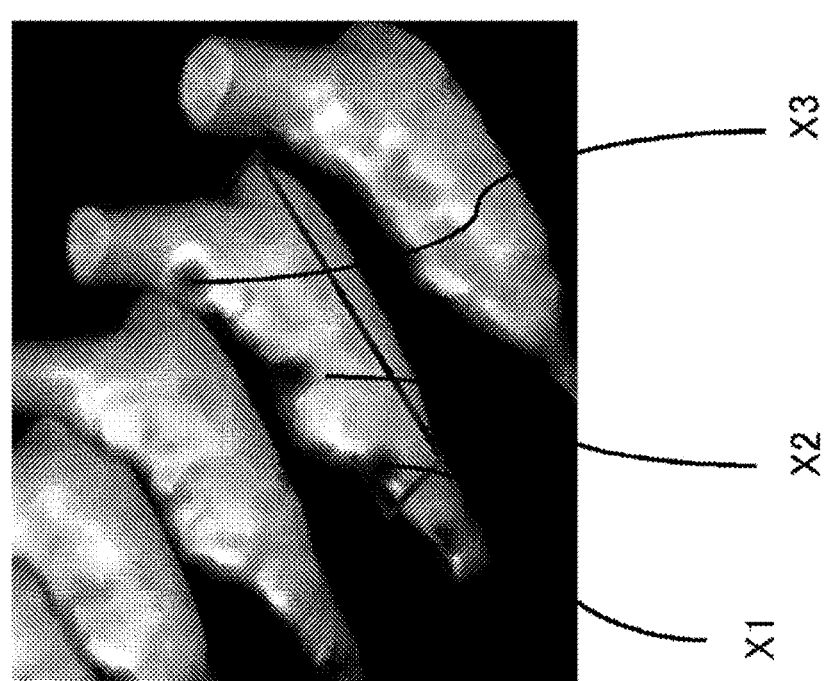
FIG. 5B is a diagram describing example X-ray feature point data in the second embodiment.
Figure 5A:
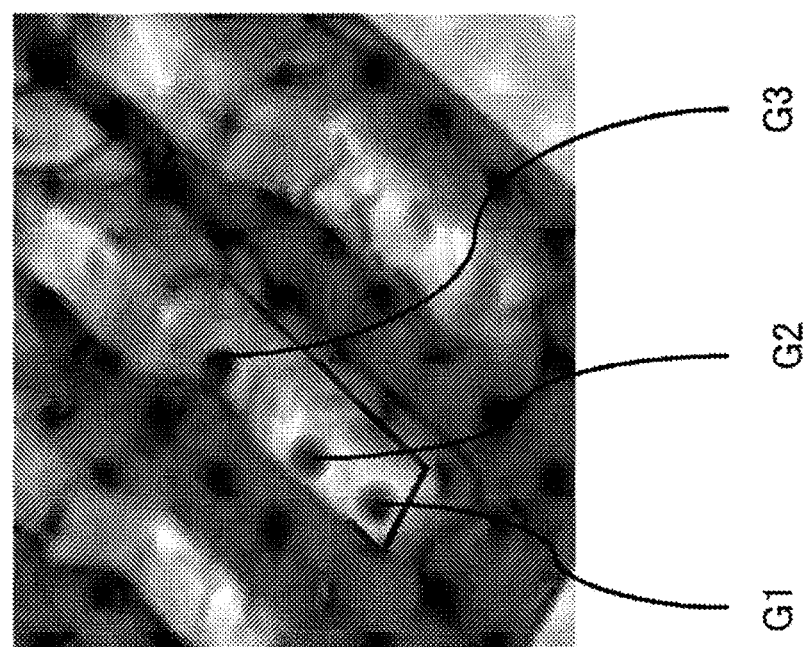
FIG. 5A is a diagram describing example external feature point data in the second embodiment.

The Z merging criterion generator 412 compares the heights of common parts between solder areas in the external shape and in the X-ray shape based on the feature point data indicating the solder areas, and generates a Z merging criterion (e.g., a height scale factor). More specifically, as shown in FIGS. 5A and 5B, for example, N points that are easily identifiable (e.g., end points or angle inflection points) are determined based on the shape data of the common parts to determine a scale factor for transforming the height in the X-ray shape data to the height in the external shape data. The common part herein is a portion identifiable both in the visual inspection and in the X-ray inspection, and excludes, for example, a back fillet that is in a blind spot behind a lead in the visual inspection.

An example method for determining the height scale factor will be described herein. FIG. 5A is a diagram describing external feature point data indicating a solder area in a predetermined portion. FIG. 5B is a diagram describing X-ray feature point data indicating the solder area in the predetermined portion. Point G1 in the external feature point data corresponds to point X1 in the $\chi$-ray feature point data, G2 corresponds to X2, and G3 corresponds to X3. In this case, the expression (G1+X1+G2+X2+ G3+X3)÷3 can determine the height scale factor.

During inspection of a board, the visual inspection apparatus and the X-ray inspection apparatus each identify solder areas on the board based on, for example, color or luminance. Thus, information about the areas may be stored into the data server 30 as feature point data (e.g., flag image format) and may be read by the Z merging criterion generator 412.

The merged shape data generator 420 merges the external shape data and the X-ray shape data based on the merging criterion generated by the merging criterion generator 410, and generates merged shape data. More specifically, an example method below may be used.

The Z merging criterion described above is used on the X-ray shape data to adjust the scale of the X-ray shape data to the scale of the external shape data. A priority is also assigned to each pixel in the external shape data and the X-ray shape data. A priority is an index indicating an item of data to be used in merging the external shape data and the X-ray shape data. For example, the external shape data includes less reliable areas behind components or other objects. For pixels indicating such areas, information in the X-ray shape data may be used with priority for merging. More specifically, information in the X-ray shape data may be used with priority for areas, such as back fillets or components mounted on the bottom surface, that are not to be solder areas in the external feature point data or for areas that are located at a distance less than a predetermined distance away from the surrounding components and are highly likely to be in a blind spot of the visual inspection apparatus. Information in the external shape data may be used with priority for other areas.

Based on the priority assigned in this manner, pixels with a higher priority in one of the external shape data or the X-ray shape data can overwrite the corresponding pixels in the other data. This can generate merged shape data.

The merged shape data inspection unit 430 determines whether the board is acceptable or defective using predetermined inspection criteria and the merged shape data. During inspection, feature point data such as the coordinates of electrodes or the heights of components may be used, in addition to the merged shape data, to increase inspection accuracy.

The composite inspection unit 440 performs final acceptance determination of the board by combining inspection results from the visual inspection, the X-ray inspection, and the merged shape data inspection. For fewer cases of false acceptance being prioritized, a board that has failed any of the three inspections may be determined to be defective. For fewer cases of overdetection, a board that has failed at least one of the visual inspection or the X-ray inspection and has failed the merged shape data inspection may be determined to be defective. The merged shape data inspection may be performed to obtain a final determination result without referring to the visual or X-ray inspection results.

(High-Accuracy Inspection Process)

Figure 6:
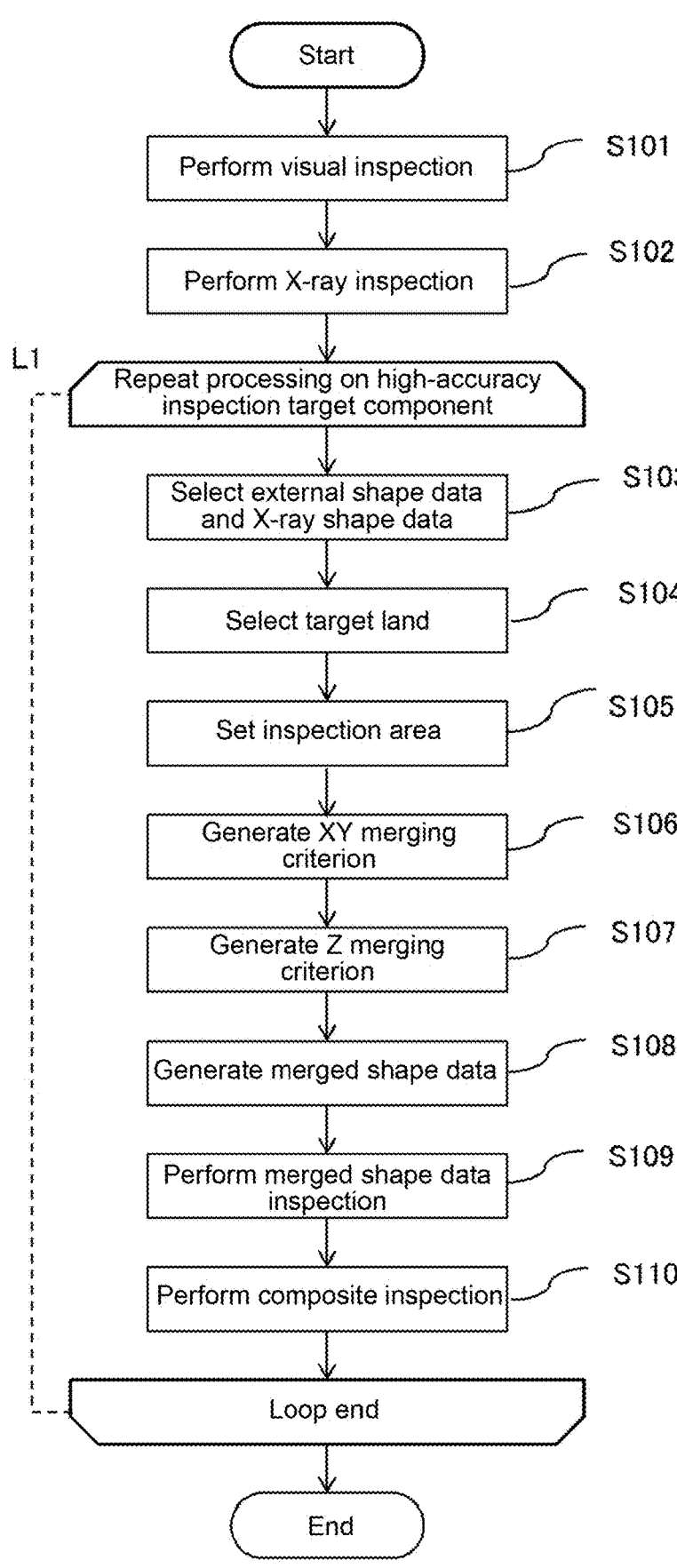
FIG. 6 is a flowchart showing a process performed by the high-accuracy board inspection system according to the second embodiment.
Figure 7:
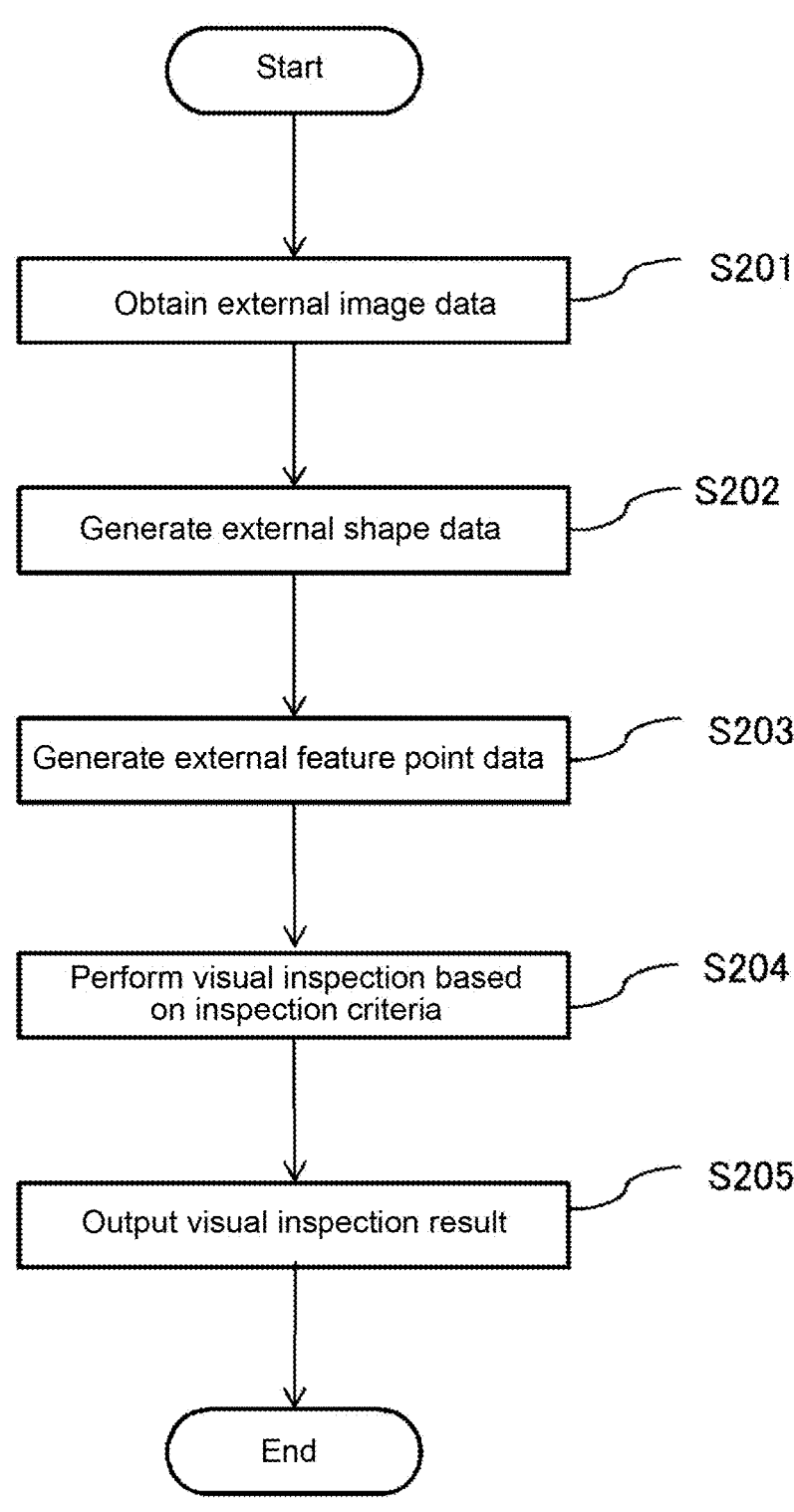
FIG. 7 is a first flowchart showing a subroutine included in the process performed by the high-accuracy board inspection system according to the second embodiment.

The high-accuracy board inspection system 1 according to the present embodiment performs high-accuracy inspection of a board as an inspection target. This process will now be described with reference to FIG. 6. FIG. 6 is a flowchart showing the process. As shown in FIG. 6, the visual inspection apparatus 10 performs visual inspection of a board (S101). FIG. 7 is a flowchart showing specific processing in step S101. As shown in FIG. 7, the visual inspection apparatus 10 obtains a visual inspection image of the inspection target board from the imaging unit 110 (S201), and generates external shape data in the external shape data generator 120 based on the obtained image (S202). The visual inspection unit 130 then generates external feature point data based on the external shape data, and performs acceptance determination using predetermined inspection criteria and the external shape data (S204). The inspection result (and the visual inspection image, the external shape data, and the external feature point data) is output to the data server 30 (S205). This ends the subroutine process.

Figure 8:
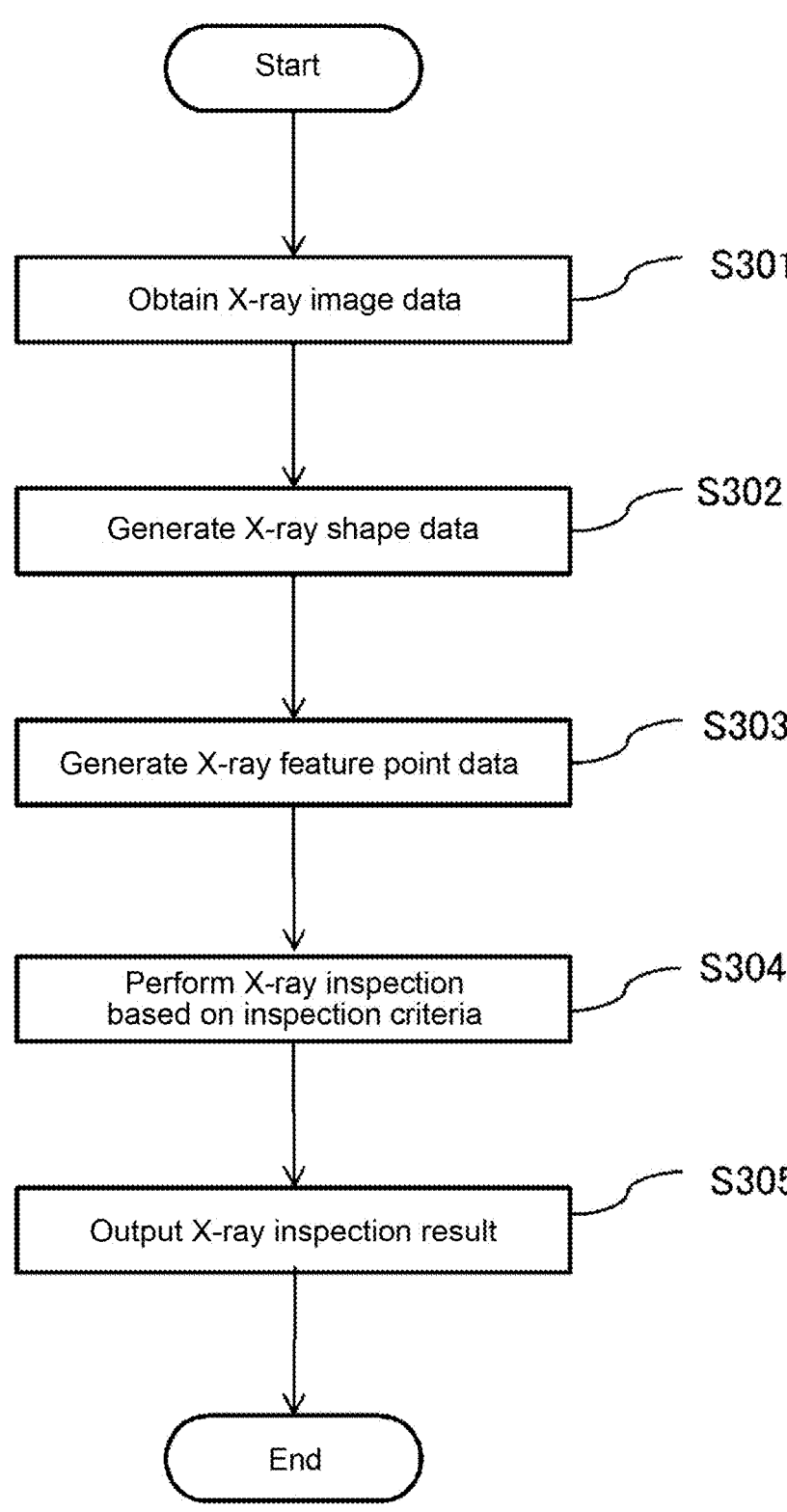
FIG. 8 is a second flowchart showing a subroutine included in the process performed by the high-accuracy board inspection system according to the second embodiment.

After the processing in step S101, the X-ray inspection apparatus 20 performs X-ray inspection of the board (S102). FIG. 8 is a flowchart showing specific processing in step S102. As shown in FIG. 8, the X-ray inspection apparatus 20 obtains an X-ray image of the inspection target board from the X-ray imaging unit 210 (S301), and generates X-ray shape data in the X-ray shape data generator 220 based on the obtained image (S302). The X-ray inspection unit 230 then generates X-ray feature point data based on the X-ray shape data, and performs acceptance determination using predetermined inspection criteria and the X-ray shape data (S304). The inspection result (and the X-ray image, the X-ray shape data, and the X-ray feature point data) is output to the data server 30 (S305). This ends the subroutine process.

In response to the end of the processing in step S102, the high-accuracy inspection terminal 40 performs processing in loop L1 (described later) on components as high-accuracy inspection targets. The components as high-accuracy inspection targets may be determined by, for example, a condition such as being preassigned as an inspection target by a program or being determined to be defective either in the visual inspection or in the X-ray inspection. These conditions may be combined to provide a condition, for each component, such as being preassigned as an inspection target by a program or being determined to be defective either in the visual inspection or in the X-ray inspection, or being preassigned as an inspection target by a program and being determined to be defective either in the visual inspection or in the X-ray inspection.

In loop L1, the merging criterion generator 410 first selects the external shape data and the X-ray shape data that are stored in the data server 30 and contain a high-accuracy inspection target component (S103). The merging criterion generator 410 then selects a land connected to the target component based on the external feature point data and the X-ray feature point data (S104). The correspondence between the positions of components on the board and each set of shape data may be obtained from an inspection program, or each set of shape data with additional information may be stored in the data server 30. In selecting a land, feature point data may be coordinate information about multiple areas indicating the outline shape of the land in each set of shape data.

The merging criterion generator 410 further sets an area containing the land selected in step S104 as an inspection target area in each set of the shape data (S105). The board being imaged is not strictly flat and may often be warped or distorted. This causes difficulty in accurate calculation of the correspondence for the entire shape data. Thus, inspection areas are set as limited areas around lands in the target component and processed individually as described above. This allows planar approximation while maintaining accuracy.

In response to the end of the processing in step S105, the XY merging criterion generator 411 generates an XY merging criterion (S106). The Z merging criterion generator 412 then generates a Z merging criterion (S107). The merged shape data generator 420 then merges the external shape data and the X-ray shape data based on the merging criterion generated in steps S106 and S107 to generate merged shape data (S108). Using the merged shape data generated in step S108 and inspection criteria, the merged shape data inspection unit 430 performs acceptance determination of the board (S109). The composite inspection unit 440 performs final acceptance determination of the board by combining inspection results from the visual inspection, the X-ray inspection, and the merged shape data inspection (S110). This ends the processing in loop L1.

When the above processing in loop L1 is performed on all the high-accuracy inspection target components, the high-accuracy board inspection system 1 ends the routine. The specific processing in steps S106 to S110 is described above as the individual functions and will not be described repeatedly.

The high-accuracy board inspection system 1 as described above can inspect the board (or components on the board) based on the highly accurate merged shape data in which the X-ray shape data complements less reliable areas in the external shape data, such as back fillets of solder or narrow and small areas with closely mounted components, and thus may obtain accurate inspection results.

In the present embodiment, the imaging unit 110 corresponds to the first imager, the visual inspection unit 130 to the first feature point data generator, the X-ray imaging unit 210 to the second imager, the X-ray inspection unit 230 to the second feature point data generator, and the merging criterion generator 410 to the calculator. The XY merging criterion generator 411 corresponds to the XY calculator, and the Z merging criterion generator 412 to the Z calculator.

<Others>

The above embodiments have been described by way of example, and the present invention is not limited to the specific embodiments described above. Various modifications and combinations may be made to the present invention within the scope of its technical idea. For example, although the above embodiments are each described as a system including an imager, a system according to another embodiment of the present invention may include no imager, as described for an information processing apparatus in the example use.

Although the visual inspection apparatus 10 in the second embodiment uses an inspection method combining the phase shifting method and the color highlight method, the visual inspection apparatus may perform inspection using either the phase shifting method or the color highlight method alone.

In some embodiments, a laser scanning measurement apparatus and the X-ray inspection apparatus may be combined, rather than the combination of the visual inspection apparatus and the X-ray inspection apparatus. This combination allows laser scan measurement to correct inaccurate Z-axis information (a height scale factor) obtained simply through X-ray inspection.

During high-accuracy board inspection in the second embodiment described above, the processing in step S102 and the processing in step S103 may be performed in the opposite order. The process may include storing the merged shape data generated in step S108 or the result of the merged shape data inspection performed in step S109 into the data server 30.

In the second embodiment described above, the high-accuracy inspection terminal 40 for high-accuracy inspection is separate from the visual inspection apparatus 10 and the X-ray inspection apparatus 20. In some embodiments, the high-accuracy inspection terminal 40 may be eliminated, and either the visual inspection apparatus 10 or the X-ray inspection apparatus 20 may include functional components for high-accuracy inspection to perform the processing in steps S103 to S110.

Although the above examples include different imaging systems for obtaining first image data and second image data, a single imaging system may obtain multiple sets of image data at different time points for processing. For example, a measurement target may be imaged multiple times with different exposure times, and the pixel-to-pixel correspondence between these sets of image data may be calculated.

APPENDIXES

A measurement system according to an aspect of the present invention is a measurement system (1) for measuring a shape of at least a part of a measurement target, the measurement system (1) comprising:

a first feature point data generator (130) configured to generate first feature point data indicating a shape of a predetermined portion of the measurement target from first image data or from first shape data, the first image data being obtained from imaging of the measurement target and including the shape of the at least the part of the measurement target, the first shape data being generated based on the first image data;

a second feature point data generator (230) configured to generate second feature point data indicating the shape of the predetermined portion of the measurement target from second image data or from second shape data, the second image data including the shape of the at least the part of the measurement target and being obtained differently from the first image data, the second shape data being generated based on the second image data; and a calculator (410) configured to calculate a positional correspondence of the predetermined portion of the measurement target between the first image data and the second image data or between the first shape data and the second shape data based on the first feature point data and the second feature point data.

A measurement apparatus (9) for measuring a shape of at least a part of a measurement target, the measurement apparatus (9) comprising:

a first feature point data generator (911) configured to generate first feature point data indicating a shape of a predetermined portion of the measurement target from first image data or from first shape data, the first image data being obtained from imaging of the measurement target and including the shape of the at least the part of the measurement target, the first shape data being generated based on the first image data;

a second feature point data generator (912) configured to generate second feature point data indicating the shape of the predetermined portion of the measurement target from second image data or from second shape data, the second image data including the shape of the at least the part of the measurement target and being obtained differently from the first image data, the second shape data being generated based on the second image data; and a calculator (913) configured to calculate a positional correspondence of the predetermined portion of the measurement target between the first image data and the second image data or between the first shape data and the second shape data based on the first feature point data and the second feature point data.

A measurement method according to another aspect of the present invention is a measurement method for measuring a shape of at least a part of a measurement target, the measurement method comprising:

(S903) generating first feature point data indicating a shape of a predetermined portion of the measurement target from first image data or from first shape data, the first image data being obtained from imaging of the measurement target and including the shape of the at least the part of the measurement target, the first shape data being generated based on the first image data;

(S904) generating second feature point data indicating the shape of the predetermined portion of the measurement target from second image data or from second shape data, the second image data including the shape of the at least the part of the measurement target and being obtained differently from the first image data, the second shape data being generated based on the second image data; and (S905) calculating a positional correspondence of the predetermined portion of the measurement target between the first image data and the second image data or between the first shape data and the second shape data based on the first feature point data and the second feature point data.

DESCRIPTION OF SYMBOLS 1 high-accuracy board inspection system
10 visual inspection apparatus
110 imaging unit
120 external shape data generator
130 visual inspection unit
20 X-ray inspection apparatus
210 X-ray imaging unit
220 X-ray shape data generator
230 X-ray inspection unit
30 data server

16

40 high-accuracy inspection terminal
410 merging criterion generator
411 XY merging criterion generator
412 Z merging criterion generator
420 merged shape data generator
430 merged shape data inspection unit
440 composite inspection unit
9 measurement apparatus
92 first imager
93 second imager
911 first feature point data generator
912 second feature point data generator
913 correspondence calculator
914 merged shape data generator

The invention claimed is:

1. A measurement system for measuring a shape of at least a part of a measurement target, the measurement system comprising:

a first feature point data generator configured to generate first feature point data indicating a shape of a predetermined portion of the measurement target from first image data or from first shape data, the first image data being obtained from imaging of the measurement target and including the shape of the at least the part of the measurement target, the first shape data being generated based on the first image data;

a second feature point data generator configured to generate second feature point data indicating the shape of the predetermined portion of the measurement target from second image data or from second shape data, the second image data including the shape of the at least the part of the measurement target and being obtained differently from the first image data, the second shape data being generated based on the second image data;

a calculator configured to calculate a positional correspondence of the predetermined portion of the measurement target between the first image data and the second image data or between the first shape data and the second shape data based on the first feature point data and the second feature point data; and a merged shape data generator configured to merge at least parts of the first image data and the second image data or at least parts of the first shape data and the second shape data based on the positional correspondence of the predetermined portion of the measurement target calculated by the calculator, and to generate merged shape data of the predetermined portion of the measurement target, wherein the calculator includes an XY merging criterion generator and a Z merging criterion generator, wherein the XY merging criterion generator is configured to determine a correspondence of horizontal positions of the measured object and generate a horizontal merging criterion for the first shape data and the second shape data, wherein the Z merging criterion generator is configured to determine a correspondence of vertical positions of the measured object and generate a vertical merging criterion for the first shape data and the second shape data, and wherein the horizontal merging criterion is a transformation matrix that converts the first shape data into the second shape data, and the vertical merging criterion is a height scale factor that converts a height in the second shape data to a height in the first shape data.

2. The measurement system according to claim 1, further comprising:

a first imager configured to image the measurement target; and a second imager configured to image the measurement target.

3. The measurement system according to claim 2, wherein the first imager is a visible light camera, and the second imager is an X-ray camera.

4. The measurement system according to claim 1, wherein the first feature point data includes at least one of coordinate data indicating the shape of the predetermined portion of the measurement target, binary image data indicating the shape of the predetermined portion of the measurement target, multivalued image data indicating the shape of the predetermined portion of the measurement target, or height inflection point data indicating a three-dimensional shape of the predetermined portion of the measurement target, and the second feature point data includes at least one of coordinate data indicating the shape of the predetermined portion of the measurement target, binary image data indicating the shape of the predetermined portion of the measurement target, multivalued image data indicating the shape of the predetermined portion of the measurement target, or height inflection point data indicating the three-dimensional shape of the predetermined portion of the measurement target.

5. The measurement system according to claim 1, wherein the measurement target is a board on which a component is mounted, and the shape of the predetermined portion of the measurement target includes at least one of a shape of a wiring pattern on the board, a shape of a land on the board, a shape of an electrode in the component mounted on the board, or a shape of solder on the board.

6. The measurement system according to claim 5, wherein the shape of the predetermined portion of the measurement target includes the shape of the wiring pattern on the board, and the XY merging criterion generator obtains the transformation matrix by matching the respective wiring patterns in the first shape data and the second shape data via pattern matching, and selecting three or four matching points from ends or corners of the wiring pattern.

7. The measurement system according to claim 5, wherein the shape of the predetermined portion of the measurement target includes the shape of solder on the board, and the Z merging criterion generator determines N points from endpoints or angle inflection points within a common area of the solder regions in the first shape data and the second shape data, and based on this, determines a height scale factor that converts a height in the second shape data to a height in the first shape data.

8. The measurement system according to claim 1, wherein the first image data is imaged with a visible light camera, the second image data is X-ray image data, and the merged shape data generator generates the merged shape data of the predetermined portion of the measurement target by using, with priority, the second image data or the second shape data for an area in a blind spot of the visible light camera in the first image data.

9. An inspection system for inspecting a measurement target, the inspection system comprising:

the measurement system according to claim 1; and a merged data inspector configured to determine whether the measurement target or a component included in the measurement target is acceptable based on the merged shape data generated by the merged shape data generator.

10. A measurement apparatus for measuring a shape of at least a part of a measurement target, the measurement apparatus comprising:

a first feature point data generator configured to generate first feature point data indicating a shape of a predetermined portion of the measurement target from first image data or from first shape data, the first image data being obtained from imaging of the measurement target and including the shape of the at least the part of the measurement target, the first shape data being generated based on the first image data;

a second feature point data generator configured to generate second feature point data indicating the shape of the predetermined portion of the measurement target from second image data or from second shape data, the second image data including the shape of the at least the part of the measurement target and being obtained differently from the first image data, the second shape data being generated based on the second image data;

a calculator configured to calculate a positional correspondence of the predetermined portion of the measurement target between the first image data and the second image data or between the first shape data and the second shape data based on the first feature point data and the second feature point data; and a merged shape data generator configured to merge at least parts of the first image data and the second image data or at least parts of the first shape data and the second shape data based on the positional correspondence of the predetermined portion of the measurement target calculated by the calculator, and to generate merged shape data of the predetermined portion of the measurement target, wherein the calculator includes an XY merging criterion generator and a Z merging criterion generator, wherein the XY merging criterion generator is configured to determine a correspondence of horizontal positions of the measured object and generate a horizontal merging criterion for the first shape data and the second shape data, wherein the Z merging criterion generator is configured to determine a correspondence of vertical positions of the measured object and generate a vertical merging criterion for the first shape data and the second shape data, and wherein the horizontal merging criterion is a transformation matrix that converts the first shape data into the second shape data, and the vertical merging criterion is a height scale factor that converts a height in the second shape data to a height in the first shape data.

11. A measurement method for measuring a shape of at least a part of a measurement target, the measurement method comprising:

generating first feature point data indicating a shape of a predetermined portion of the measurement target from first image data or from first shape data, the first image data being obtained from imaging of the measurement target and including the shape of the at least the part of the measurement target, the first shape data being generated based on the first image data;

generating second feature point data indicating the shape of the predetermined portion of the measurement target from second image data or from second shape data, the second image data including the shape of the at least the part of the measurement target and being obtained differently from the first image data, the second shape data being generated based on the second image data;

calculating a positional correspondence of the predetermined portion of the measurement target between the first image data and the second image data or between the first shape data and the second shape data based on the first feature point data and the second feature point data;

merging at least parts of the first image data and the second image data or at least parts of the first shape data and the second shape data based on the calculated positional correspondence of the predetermined portion of the measurement target; and generating merged shape data of the predetermined portion of the measurement target, wherein calculating the positional correspondence includes determining a correspondence of horizontal positions of the measured object and generating a horizontal merging criterion for the first shape data and the second shape data, and determining a correspondence of vertical positions of the measured object and generating a vertical merging criterion for the first shape data and the second shape data, and wherein the horizontal merging criterion is a transformation matrix that converts the first shape data into the second shape data, and the vertical merging criterion is a height scale factor that converts a height in the second shape data to a height in the first shape data.

12. The measurement method according to claim 11, wherein the first image data is imaged with a visible light camera, the second image data is X-ray image data, and the generating the merged shape data includes generating merged shape data of the predetermined portion of the measurement target using, with priority, the second image data or the second shape data for an area in a blind spot of the visible light camera in the first image data.

13. An inspection method for a measurement target, the inspection method comprising:

obtaining merged shape data of a predetermined portion of a measurement target generated in the generating the merged shape data according to claim 11; and determining whether the measurement target or a component included in the measurement target is acceptable based on the obtained merged shape data of the predetermined portion of the measurement target.

14. A non-transitory computer readable medium storing a program for causing a computer to perform operations included in the method according to claim 11.

* * * * *